July 8, 1930. T. G. NYBORG ET AL 1,770,007
BELT CONVEYER
Filed Jan. 26, 1928 2 Sheets-Sheet 1

Inventors
TAGE GEORG NYBORG,
MARK FREDERICK HIGGINS,

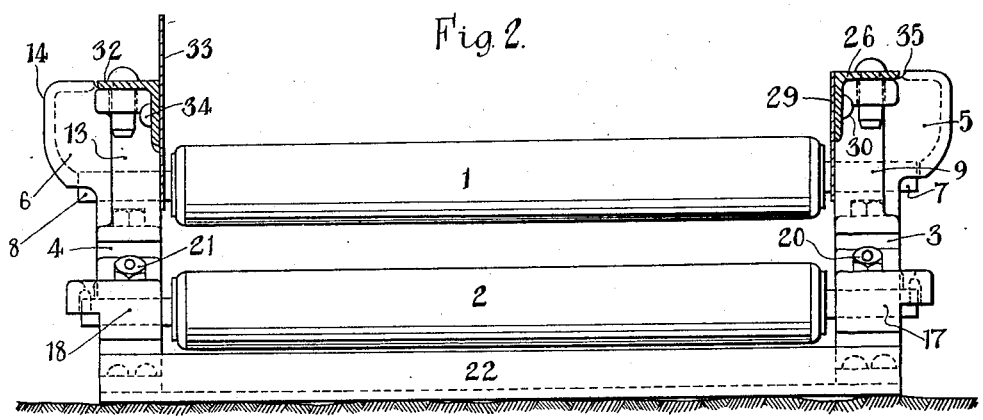
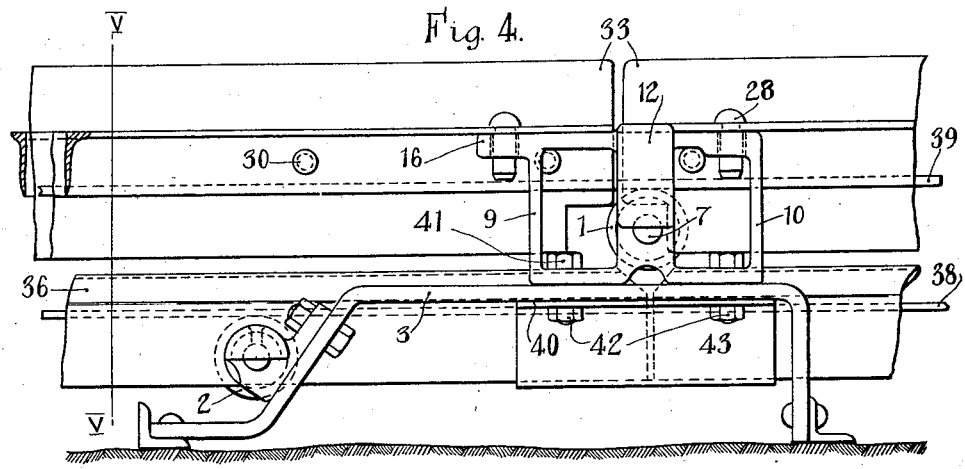
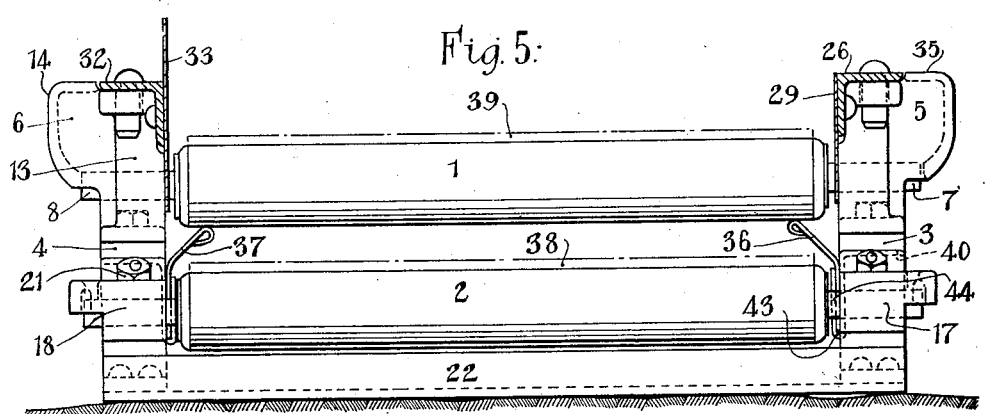

Patented July 8, 1930

1,770,007

UNITED STATES PATENT OFFICE

TAGE GEORG NYBORG AND MARK FREDERICK HIGGINS, OF WORCESTER, ENGLAND

BELT CONVEYER

Application filed January 26, 1928, Serial No. 249,658, and in Great Britain May 24, 1927.

This invention relates to belt conveyers more particularly of the flat belt kind, and has for its object to provide an improved construction of such conveyer designed to increase the usefulness of the same in underground workings when conveying coal or iron ores or the like broken or granulated materials.

With these conveyers as usually constructed difficulties have been experienced owing to the spillage generally incurred and the necessity of loading the material on to the belt with care and deliberation.

To reduce these drawbacks we provide an improved construction of belt conveyers of the kind above referred to, comprising a fixed substantially vertical wall, preferably in the form of a metal plate, on each side of and closely adjacent to the travelling belt, thus forming a fixed channel in which the belt travels and facilitating the operation of rapidly loading the belt with material at any point in its length and with considerably reduced spillage.

The preferred form of the invention is illustrated in the accompanying drawings in which:

Fig. 2 is a part sectional view on the line II—II of Fig. 1 looking in the direction of the arrows;

Fig. 4 is a side view of a modified construction;

Fig. 5 is a part sectional view on the line V—V of Fig. 4.

Figure 1:
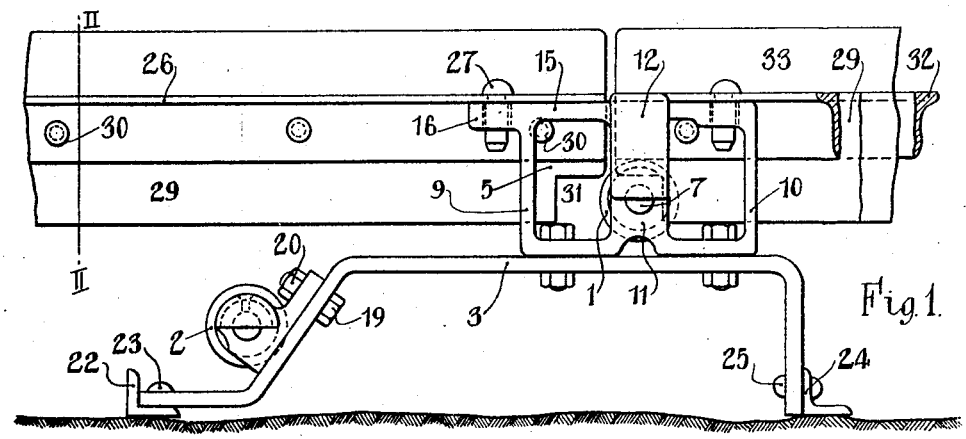
Fig. 1 is a side view.
Figure 3:
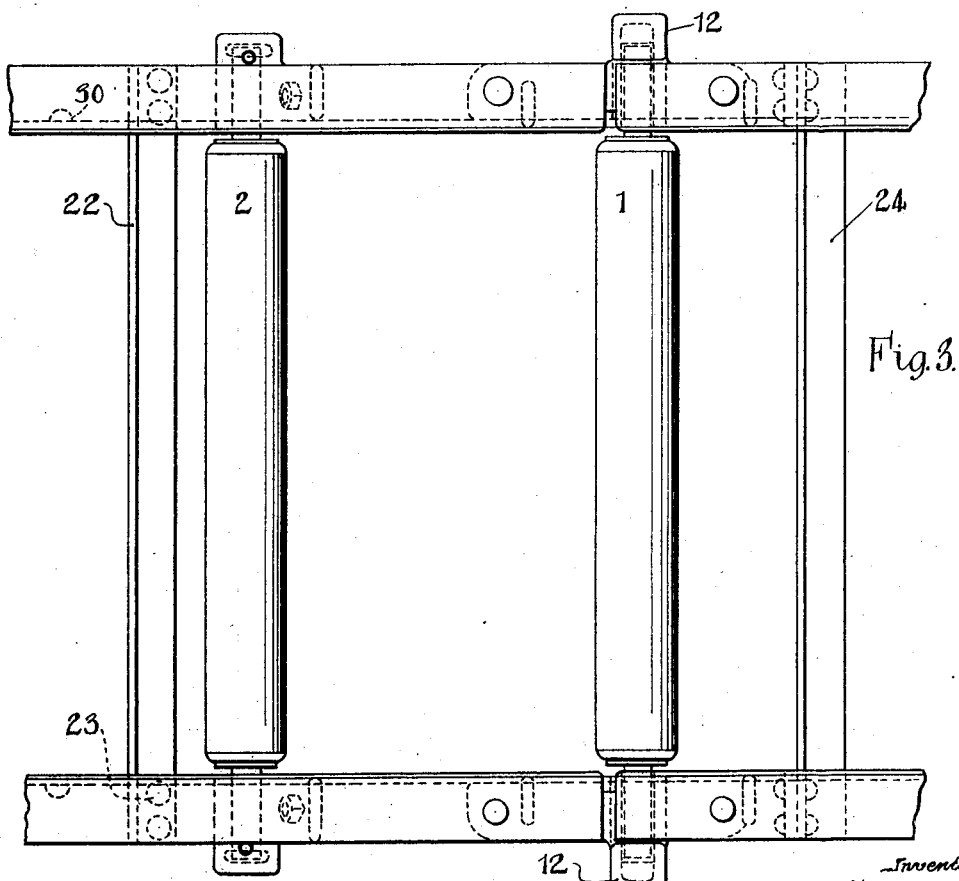
Fig. 3 is a plan view.

Referring to the drawings: The conveyer belt, not shown in Figs. 1 and 2, is carried upon upper rollers 1 and lower rollers 2, of which the rollers 1 support the operative loaded part of the conveyer belt while the rollers 2 support the return or idle part of the conveyer. The rollers 1 and 2 are supported upon bearing brackets 3 and 4 (Fig. 2) which are secured, for instance, along the floor of a coal mine gallery or the like working. Upon each bracket 3 or 4, is secured a corresponding bearing box 5 or 6, designed to receive the corresponding end journals 7, 8, of the roller 1.

The bearing box 5, in the construction shown, is in the form of an open-work frame or grid having two upright end members 9, 10, and a middle upright member 11 of considerably greater width than the said end members, the middle member 11 containing the bearing proper which is enclosed within a protecting casing 12 enclosed on the front, rear, and outer sides in order to shield the bearing and the journal 7 of the roller 1 from coal dust and the like, while allowing the roller readily to be lifted out of the bearing when desired.

The construction of the bearing box 6 at the opposite end of the roller 1 is exactly similar to that of the bearing box 5 and has upright members and a protecting casing corresponding to the members and casing 9, 10, 11 and 12 respectively; in the case of bearing box 6 however only the end member 13 and the protecting casing 14 appear in Fig. 2.

The three upright members 9, 10, and 11, (Fig. 1) are interconnected by a top member 15 having a projecting lug or the like portion 16 which is pierced with a hole to receive a bolt or the like fixing device.

The ends or journals of the lower roller 2 are supported in bearings 17, 18, of which the bearing 17 is secured to the bracket 3 by a bolt 19 and nut 20, while the bearing 18 is similarly secured upon the bracket 4 by means of a bolt and nut 21. The adjacent feet of the brackets 3 and 4 rest upon an angle iron 22 to which the said feet are secured by rivets or bolts such as shown at 23, while the other ends of the brackets, which are arranged in a substantially vertical position, are secured to the vertical member of an angle iron 24 by means of rivets 25 (Fig. 1); the angle irons 22 and 24 may be firmly secured to the floor of the gallery or the like working, or they may rest only on the floor.

One set of rollers 1, 2, together with the above described supporting arrangements is rigidly connected with the adjacent set of similar rollers and its supports by means of angle irons, one line of angle irons connecting the end supporting brackets 3 and the other line of angle irons connecting the opposite end supporting brackets 4. In the arrangement illustrated, the supporting brackets 3 are supposed to be aligned upon the side of the gallery adjacent the face being worked while the supporting brackets 4 are aligned upon the side of the gallery remote from the face and usually referred to as the goaf side. An angle iron connecting two adjacent aligned supporting brackets 3 is shown at 26, the horizontal member of the said angle iron being connected at the right hand end, as shown in Fig. 1, to the projecting lug portion 16 of the upper member 15 of the corresponding bearing box 5 by means of a bolt or pin 27, while the other end of the angle iron 26 is similarly connected by a bolt or pin 28 directly to the said top member 15 of the corresponding bearing box 5. The metal plate forming the face side of the fixed channel for the conveyer belt is shown at 29 in Figs. 1 and 2 connected to the vertical member of the angle iron 26 by means of rivets such as 30, the upper edge of the plate 29 being arranged substantially level with the horizontal member of the angle iron 26 as is clearly seen in Fig. 2. At its right hand lower corner the plate 29 is cut away as shown at 31 in Fig. 1 in order to enable the upper roller 1 to be readily inserted in and withdrawn from its operative position in the bearing box 5.

An angle iron connecting the aligned supporting brackets 4 on the goaf side of the gallery is shown at 32 in Figs. 1 and 2 and is secured at each end upon the top member 15 or 16 of the corresponding bearing box 6 in a manner similar to that described above in connection with the angle iron 26 on the face side of the gallery. The vertically arranged metal plate forming the goaf side of the fixed channel for the conveyer belt is shown at 33 in Figs. 1 and 2, and is of a considerably greater width than that of the plate 29; the said plate 33 is secured to the inner vertical member of the angle iron 32 by means of rivets such as that shown at 34 in Fig. 2.

The protecting casings 12 and 14 may be, and preferably are, cast integral with the remainder of the bearing boxes 5 and 6 respectively, and the top sides of the said protecting casings are preferably formed with a shoulder as shown at 35 on the right of Fig. 2, the said shoulder being as closely as possible of the same height as the thickness of the horizontal member of the adjacent angle iron 26 resting upon the top member 15 of the bearing box 5 so that a substantially level surface is provided at each bearing box. This however is only to be regarded as of convenience in the assembling of the parts and in the operation of the conveyer and is not an essential feature of the invention.

In the construction shown in Figs. 4 and 5 an additional angle iron is arranged on each side of the fixed channel in which the operative strand of the belt travels. These angle irons have each an upwardly and inwardly sloping member as shown at 36 and 37 on the right and left respectively of Fig. 5, and these upwardly sloping members pass over the outer edges of the return strand 38 of the conveyer belt, shown in dot-and-dash lines in Fig. 5, so that any spillage from the upper or operative strand 39 of the belt is diverted and prevented from falling upon the return strand 38. The additional angle irons may be supported in position in any convenient manner. In the arrangement illustrated an additional bracket having a horizontal and a vertical member is fixed to the underside of the upper member of the corresponding bearing bracket 3 or 4. The horizontal member 40 of one of these additional brackets is shown in Fig. 4 secured to the underside of the upper member of the corresponding bearing bracket 3 by means of bolts 41 and nuts 42. The vertical member of the bracket is bent over double so as to form a U as shown at 43 in Fig. 4 and on the right in Fig. 5. The vertical member 44 of the additional angle iron 36 is inserted into the said U-member 43 of the additional bracket in which it is securely retained without any necessity for fixing means, such as bolts and nuts; the latter may however be used, if desired.

In operation any spillage from the operative strand 39 of the belt which falls upon the protecting member 36 or 37 of the additional angle iron is thereby diverted outwards and prevented from landing upon the return strand 38 of the belt; as the latter is travelling in the opposite direction to the operative strand it would carry any material falling thereon away from its desired destination, as will readily be understood.

From the above description regarded in conjunction with the drawings it will be seen that a fixed channel is formed for the conveyer belt between the two vertical plates 29 on the face side and 33 on the goaf side, and that the upper edge of the angle iron 26 on the face side forms the top of the said channel upon which the coal or other material mined can be lifted before being placed on to the belt for conveyance to the shaft. It will also be seen that the vertically arranged wider plates 33 on the goaf side of the conveyer channel enables the operator to fling the material upon the conveyer belt against a strong upstanding edge without any great care and deliberation and without danger of causing much spillage.

What we claim and desire to secure by Letters Patent is:—

1. In a conveyer of the endless flat belt kind, adapted for use and for substantially horizontal motion in mines, in combination, an endless travelling belt arranged substantially parallel to the face to be worked, a vertical plate arranged closely adjacent to and extending above the face side of the belt, and a second vertical plate arranged closely adjacent to the goaf side of the belt, the top of this plate extending to a greater distance above the belt than the top of said vertical plate on the face side of the belt to further reduce the spillage of material thrown upon the travelling belt from the face side of the latter.

2. In a conveyer of the endless flat belt kind, adapted for use and for substantially horizontal motion in mines, in combination, an endless travelling belt arranged substantially parallel to the face to be worked, an inverted L-angle iron on the face side, and an inverted L-angle iron on the goaf side of the belt, the vertical members of the angle irons being arranged next the belt and their horizontal members at substantially the same level above the belt, side plates forming a belt channel fixed to the said vertical members, the top of the face side plate being level with the horizontal member of the corresponding angle iron, and the top of the goaf side plate extending appreciably above the horizontal member of the corresponding angle iron.

3. In a conveyer of the endless flat belt kind, adapted for use and for substantially horizontal motion in mines, in combination, an endless travelling belt arranged substantially parallel to the face to be worked, rollers carrying the upper strand of the conveyer belt, bearings for each roller, brackets fixed to the ground and carrying said bearings, an inverted L-angle iron on each side of the belt with its vertical member adjacent the belt and its horizontal member fixed upon the corresponding bearing bracket, and a vertical plate fixed to the vertical member of each said angle iron to form a laterally closed channel in which the belt travels.

4. In a conveyer of the endless flat belt kind, adapted for use and for substantially horizontal motion in mines, in combination, an endless travelling belt arranged substantially parallel to the face to be worked, rollers carrying the upper strand of the conveyer belt, rollers for the return strand of the belt at a lower level than those carrying the upper strand, brackets arranged in pairs and fixed to the ground for supporting the rollers, a bearing box for an upper roller secured upon one part of each bracket, and a bearing box for a lower roller secured upon another part of the same bracket, an inverted L-angle iron on each side of the belt with its vertical member adjacent the belt and its horizontal member fixed to the bearing box for an upper roller, and a vertical plate fixed to the vertical member of each said angle iron to form a laterally closed channel in which the belt travels.

5. In a conveyer of the endless flat belt kind adapted for use and for substantially horizontal motion in mines, the combination with the belt, of a substantially vertical wall arranged on each side of and closely adjacent to the belt forming a fixed channel in which the operative upper strand of the belt travels, and means including supporting brackets and angle irons removably supported by said brackets for preventing material which spills over either of said side walls from falling upon the return lower strand of the belt.

6. In a conveyer of the endless flat belt kind adapted for use and for substantially horizontal motion in mines, the combination with the belt, of a substantially vertical wall arranged on each side of and closely adjacent to the belt forming a fixed channel in which the operative upper strand of the belt travels, and an angle iron carried by U-shaped brackets on each side of the belt having a member sloping inwards and upwards over the corresponding side of the return lower strand of the belt, to divert outwards material spilling from the operative upper strand and prevent said material from falling upon the return lower strand of the belt.

7. In a conveyer of the endless flat belt kind, adapted for use and for substantially horizontal motion in mines, in combination, an endless travelling belt arranged substantially parallel to the face to be worked, a vertical plate arranged closely adjacent to and extending above the face side of the belt, a second vertical plate arranged closely adjacent to the goaf side of the belt, the top of this plate extending to a greater distance above the belt than the top of the said vertical plate on the face side of the belt, and an angle iron fixed on each side of the belt having a member sloping inwards and upwards over the corresponding side of the return lower strand of the belt, to divert outwards material spilling from the operative upper strand and prevent said material from falling upon the return lower strand of the belt.

8. In a conveyer of the endless flat belt kind, a belt having an operative strand and a return strand, a plurality of U-shaped brackets adjacent each edge of said return strand, and angle irons having vertical parts and upwardly and inwardly inclined parts, said vertical parts being supported in said U-shaped brackets with the inclined parts extending over the edges of the return strand of the belt to deflect material falling from the operative strand of the belt.

9. In a conveyer of the endless flat belt type, a belt having an operative strand and a return strand, a plurality of U-shaped plate brackets adjacent each edge of said return strand, and angle irons each having a vertical part and an upwardly and inwardly inclined part, said angle irons being supported at each end by the vertical parts thereof fitting in said U-shaped brackets so that the inclined parts of said angle irons extend over the edges of the return strand of the belt to deflect the material falling from the operative strand of the belt.

In testimony whereof, we affix our signatures.

TAGE GEORG NYBORG.
MARK FREDERICK HIGGINS.